United States Patent

[11] 3,615,717

| [72] | Inventors | Dee Rich Morgan<br>Liverpool;<br>Delmar Lloyd Andersen, Syracuse; Cloyce L. Hankinson, Camillus, all of N.Y. |
|---|---|---|
| [21] | Appl. No. | 675,291 |
| [22] | Filed | Oct. 16, 1967 |
| [45] | Patented | Oct. 26, 1971 |
| [73] | Assignee | The Borden Company<br>New York, N.Y. |

[54] PROCESS OF INHIBITING STALING OF MILK PRIOR TO STERILIZATION
2 Claims, No Drawings

[52] U.S. Cl................................................. 99/183, 99/151, 99/185, 99/213, 99/224
[51] Int. Cl............................................... A23c 9/08
[50] Field of Search........................... 99/48, 54, 61, 105, 183, 212, 213; 260/210

[56] References Cited

UNITED STATES PATENTS

| Re. 23,523 | 7/1952 | Baker............................ | 99/183 X |
|---|---|---|---|
| 2,275,225 | 3/1942 | Hubbell........................ | 99/54 |
| 2,421,063 | 5/1947 | Baier............................. | 260/210 |
| 2,761,780 | 9/1956 | Daniel........................... | 99/183 X |
| 2,818,342 | 12/1957 | Ransom........................ | 99/54 X |
| 2,924,531 | 2/1960 | Stewart, Jr. et al.......... | 99/212 |
| 3,072,491 | 1/1963 | Leviton........................ | 99/183 X |
| 3,415,655 | 12/1968 | Hino et al..................... | 99/54 |

FOREIGN PATENTS

| 144,616 | 6/1948 | Australia...................... | 99/54 |

OTHER REFERENCES

Hackh's Chemical Dictionary, 3rd ED., page 384 (1944)

*Primary Examiner*—Norman Yudkoff
*Assistant Examiner*—F. E. Drummond
*Attorney*—John L. Sigalos

ABSTRACT: This invention relates to a new and improved process for inhibiting the development of stale flavors in milk products during the storage thereof, and to new and useful milk products obtained thereby which maintain their fresh flavors and display an increased resistance to staling upon being stored for long periods of time. More particularly, it relates to milk products containing a bioflavonoid in an amount sufficient to inhibit staling.

PROCESS OF INHIBITING STALING OF MILK PRIOR TO STERILIZATION

BACKGROUND OF THE INVENTION

Milk and milk-containing products heretofore known in the art can be sterilized, dried or otherwise preserved so that they can be stored over a period of several months. However, as the storage times thereof increase, certain undesirable flavor changes, characterized as "staling," and color changes take place. While no precise definition is available, staling is defined as the chemical degradation of a product which produces a loss of flavor or an undesirable flavor known in the dairy art as glue or paste flavor. The color changes and staling are especially aggravated in liquid concentrated and H.T.S.T. milk products.

SUMMARY OF THE INVENTION

Milk products have now been found that can be stored for considerably longer periods of time than their corresponding prior art counterparts without staling and without objectionable color change.

Briefly stated, the present invention comprises the method of adding a flavonoid to milk products in an amount sufficient to inhibit staling and to the resultant products.

DETAILED DESCRIPTION

The flavonoid used may be either naturally occurring or synthetic. Of these the naturally occurring citrus bioflavonoids are preferred, especially hesperidin because in the amounts required to inhibit staling it does not impart any bitter flavor to the milk product. Examples of other suitable flavonoids that can be used are catechol, naringin, phloridzin, rutin, neohesperidin, hesperidin methyl chalcone, quercitin, mixtures thereof, and commercially available flavonoid extracts such as lemon bioflavonoid complex, and lemon-orange flavonate glycoside. Naringin and phloridzin are preferably used in the lower range of permissible concentration since they tend to impart a slightly bitter flavor in the higher concentrations.

As to the proportions, the flavonoid is added to the milk product in an amount sufficient to inhibit staling. It has been found that this corresponds to from about 0.002 percent to about 0.04 percent flavonoid based on the total weight of solids in the finished product, with 0.01 to about 0.02 being preferred for liquid milk products. While larger amounts of flavonoid may be added, it is not advisable to do so because it is uneconomical and, more importantly, the bitter flavor characteristic of flavonoids may be imparted to the final product.

The addition of the flavonoid to the milk products may be made at any time during the processing of the product prior to being packaged for storage since the heating and cooling temperatures used to prepare such products do not affect the flavonoids. It is preferred to add the flavonoid to liquid milk products just prior to sterilization and in the case of powdered milk products just before drying.

The bioflavonoids can be added to inhibit staling and color change in any milk products which are packaged and conventionally stored for long periods of time; particularly those stored under nonrefrigerated conditions. Examples are evaporated milk, concentrated milk, dried whole milk powder, dried skim milk powder, powdered coffee whiteners, canned milkshakes, and the like. The invention is equally applicable to the corresponding imitation and filled milk products in which vegetable and/or fish oils are substituted for the milk fat.

To illustrate further the present invention and the advantages thereof, the following specific examples are given, it being understood that these are merely intended to be illustrative and not limitative.

EXAMPLES 1–4.

Two hundred and sixty gallons of raw whole milk were preheated in a vat to 165° F. for 10 minutes and then further preheated in a tubular heater to 260° F. for 35 seconds as it was pumped to a vacuum concentrator and concentrated.

The concentrated milk was standardized with water so as to give 26.0 percent total solids in the finished product. The concentrate was divided into 160-pound batches before further processing. The first batch was run as a control. Catechol was added to the second batch at a rate of 1 gm./160 lbs. to give 0.0053 percent catechol in the final product (based on weight of total solids). Three succeeding batches had 1.5 gm./160 lbs. added of phloridzin, hesperidin and naringin, respectively to give 0.0078 percent thereof in the final product.

These variations were all processed by heating the concentrate to 160° F. as it was pumped to a deaeration chamber at a vacuum of 10–11 inches. It was further heated to 262° F. in a tubular heater with a 7-second holding tube ahead of a steam injector heater. The temperature was increased to 295° F. with 2–3-second holding time before cooling in a vacuum chamber to 170° F. From the vacuum chamber, it wasp pumped through a sterile homogenizer at 2,500 p.s.i., cooled to about 65° F. in a tubular cooler, and aseptically canned.

The freshly canned concentrates were organoleptically tested and all tasted essentially the same. However, organoleptic testing after 6-months storage at 90°F. and 75° F., found the samples containing hesperidin to be considerably fresher tasting and to have less of a stale flavor character. The sample containing the catechol was better than the control, albeit not as good as those containing the hesperidin. The samples containing phloridzin and naringin were fresher than the control but slightly bitter at these concentrations.

While the above description of the subject process and products has been made with specific reference to hesperidin, catechol, phloridzin and naringin, it is to be understood as being applicable to other flavonoids.

EXAMPLE 5

The process and flavonoids of examples 1 to 4 are used, except that the 0.026 percent of each flavonoid is used in place of the proportions set forth in the previous examples. In each case staling is inhibited in the concentrated milk containing the flavonoid.

EXAMPLE 6

Eighty pounds of a liquid imitation coffee whitener (liquid Cremora) were made in the usual manner. The product contained sodium caseinate, coconut fat, minerals, gum, sugars and water. Hesperidin 0.003 percent (based on finished weight of product) was added to 35 pounds of this product and the remainder used as a control. The two products were filled into cans and sterilized H.T.S.T. in a continuous sterilizer.

The freshly canned products all tasted essentially the same. However, after 6-months storage at 75° F. and 50° F., the samples containing hesperidin were considerably fresher tasting and had less of a stale flavor character as determined by organoleptic testing.

EXAMPLE 7

The following bioflavonoids were added separately at levels of 0.003 percent (based on total weight of finished product) to nine lots of a commercial batch of Borden's strawberry milkshake just prior to canning and subsequent sterilization:
1. Hesperidin (practical)
2. Quercitin (practical)
3. Chalcone
4. Hesperidin (reagent grade)
5. Hesperidin (purified)
6. Hesperidin (complex)
7. Hesperidin Methyl Chalcone
8. Lemon-Orange Flavonate Glycoside; and 9. Lemon Bioflavonoid Complex The nine lots of strawberry milkshake preparation each containing a different bioflavonoid along with a control were canned and sterilized H.T.S.T. (220° F. for 3 min. 48 sec. 262° F. for 2 minutes, and then cooled to 80° F.) on a continuous sterilizer. These canned milkshakes were stored at 50° F. and checked initially and at 3-month intervals for one year. Throughout the year's storage and at the end of one year the strawberry milkshakes containing the bioflavonoids were tested organoleptically and always judged superior in flavor to the control. The strawberry milkshakes containing the bioflavonoids were judged to be more fresh and intense in flavor. The color of the milk shakes containing the bioflavonoids had faded to a much less degree than the control at the end of 1 year's storage. The staling and color loss in the control were evident at the end of 3 months.

EXAMPLE 8

In another series of experiments 0.003 percent (based on total weight of finished product) of hesperidin (practical) was added to the following flavors of commercial batches of Borden milkshakes:
1. Chocolate
2. Vanilla
3. Cherry-Vanilla
4. Coffee
5. Mocha The various flavors of milkshakes containing hespiridin along with controls were canned and sterilized (H.T.S.T.) on a continuous sterilizer. These canned milkshakes were stored at 50° F. and checked initially and at 3-month intervals for one year. In all cases the flavor of the samples containing hesperidin were judged to be superior to the control sample containing no hesperidin. The color of the cherry-vanilla sample containing hesperidin had faded much less than the control sample after 1 year's storage at 50° F.

EXAMPLE 9

Raw skim milk is pasteurized and condensed to 30 percent solids. Hesperidin in the proportion of 0.010 (based on weight of solids) is added and the mixture spray-dried in a conventional dry box. The resultant product is resistant to staling even upon extended storage.

It will be understood that it is intended to cover all changes and modifications of the examples of the invention herein chosen for the purpose of illustration which do not constitute departures from the spirit and scope of the invention.

What is claimed is:

1. A process for inhibiting the staling of a sterile, canned milk product during storage comprising adding thereto prior to sterilization from about 0.002 percent to about 0.04 percent based on total solids of the product of a citrus bioflavonoid.

2. The process of claim 1, wherein the bioflavonoid is hesperidin added in the proportion of from about 0.01 percent to about 0.02 percent based on total solids of the product.

* * * * *